US011514442B2

(12) United States Patent
Alves et al.

(10) Patent No.: US 11,514,442 B2
(45) Date of Patent: Nov. 29, 2022

(54) SECURE INPUT USING TOKENS

(71) Applicant: Entersekt (Pty) Ltd, Stellenbosch (ZA)

(72) Inventors: Dino Dominique Rodrigues Alves, Stellenbosch (ZA); Francois Archibald Nolte, Stellenbosch (ZA); Philip Johannes Cornelis Nel, Stellenbosch (ZA); Christopher Karl-Heinz Zeuch, Stellenbosch (ZA); Iftekhar Akoob, Stellenbosch (ZA); Riaan Jacobs, Stellenbosch (ZA); Bernard Wagner, Stellenbosch (ZA)

(73) Assignee: Entersekt International Limited, Ebene (MU)

( * ) Notice: Subject to any disclaimer, the term of this patent is extended or adjusted under 35 U.S.C. 154(b) by 220 days.

(21) Appl. No.: 16/794,959

(22) Filed: Feb. 19, 2020

(65) Prior Publication Data

US 2020/0265423 A1    Aug. 20, 2020

(30) Foreign Application Priority Data

Feb. 19, 2019    (ZA) .................................. 2019/01046

(51) Int. Cl.
G06Q 40/00 (2012.01)
G06Q 20/38 (2012.01)
G06Q 20/40 (2012.01)

(52) U.S. Cl.
CPC ....... G06Q 20/385 (2013.01); G06Q 20/4012 (2013.01)

(58) Field of Classification Search
CPC ...... G06Q 20/40; G06Q 20/322; G06Q 20/20; G06Q 20/32; G06Q 20/10; G06Q 20/382; G06Q 20/385; G06Q 20/12; G06Q 30/0601; G06Q 20/4012; G07F 19/20; G07F 7/1008; G07F 7/08
USPC ....... 235/379, 385; 705/16, 26.1, 35, 39, 44, 705/75
See application file for complete search history.

(56) References Cited

U.S. PATENT DOCUMENTS

| 8,904,482 | B1 | 12/2014 | Dotan et al. |
| 8,973,114 | B2 | 3/2015 | von Krogh |
| 10,127,537 | B1* | 11/2018 | Ellis ..................... G06Q 20/204 |
| 2014/0108810 | A1 | 4/2014 | Chenna |

* cited by examiner

Primary Examiner — Jamara A Franklin
(74) Attorney, Agent, or Firm — Osha Bergman Watanabe & Burton LLP (57) ABSTRACT

A system and method for secure input using tokens is provided. A computer-implemented method conducted at a server computer includes receiving a transaction confirmation request associated with a transaction. The method includes providing, to an end-user via an online platform, a plurality of user input options associated with the transaction. The method includes receiving, from the end-user via the online platform, a unique token associated with a selected user input option, the unique token having been obtained by the end-user inputting a selection of a user input option into an end-user token generator which is configured to generate the unique token uniquely specifying the selected user input option. The method includes validating the unique token and identifying the selected user input option with which the unique token is associated.

20 Claims, 4 Drawing Sheets

SECURE INPUT USING TOKENS

CROSS-REFERENCE TO RELATED APPLICATIONS

This application claims priority from South African provisional patent application number 2019/01046 filed on 19 Feb. 2019, which is incorporated by reference herein.

FIELD OF THE INVENTION

This invention relates to a system and method for secure input using tokens.

BACKGROUND TO THE INVENTION

Banking transactions such as making a payment in favour of a beneficiary, creating a beneficiary profile, configuring daily payment limits and the like are increasingly being conducted online. Due to the sensitive nature of these transactions, financial institutions providing online platforms enabling such functionality need to implement sophisticated security systems to protect themselves and their clients ("end-user") from the nefarious activity of cyber-criminals. There have been numerous efforts to improve the security of these transactions. One example is the provision of offline token generating devices for generating one-time PINs (OTPs) to implement so-called multi-factor authentication, where the token generating device represents something the end-user has and a username-password combination represents something the end-user knows. These multiple factors typically make it more difficult for an attacker to gain all the information required to breach the security system.

Yet despite continued efforts such as these to improve the security of such transactions, vulnerabilities and shortcomings remain. Accordingly, there is scope for improvement.

The preceding discussion of the background to the invention is intended only to facilitate an understanding of the present invention. It should be appreciated that the discussion is not an acknowledgment or admission that any of the material referred to was part of the common general knowledge in the art as at the priority date of the application.

SUMMARY OF THE INVENTION

In accordance with an aspect of the invention there is provided a computer-implemented method conducted at a server computer comprising: receiving a transaction confirmation request associated with a transaction; providing, to an end-user via an online platform, a plurality of user input options associated with the transaction; receiving, from the end-user via the online platform, a unique token associated with a selected user input option, the unique token having been obtained by the end-user inputting a selection of a user input option into an end-user token generator which is configured to generate the unique token uniquely specifying the selected user input option; and, validating the unique token and identifying the selected user input option with which the unique token is associated.

The method may include accessing the plurality of user input options. The plurality of user input options may include a data structure including user input options in the form of character strings, each character string being associated with a decision, command or instruction that the end-user can input in respect of the transaction.

The method may include initiating the transaction in accordance with the identified user input option.

Validating the unique token and identifying the selected user input option may include matching the received unique token with one of a plurality of output tokens included in a token validation data structure and identifying a user input option associated therewith.

The method may include obtaining a set of unique tokens for validation of the received unique token, including: generating a unique token associated with each user input option, including inputting each user input option into a token generating algorithm to generate a unique token based on the user input option; and, outputting each unique token in association with the user input option with which it is associated.

Outputting each unique token in association with the user input option with which it is associated may include outputting a token validation data structure in which each unique token is linked the user input option with which it is associated. The method may include temporarily storing the token validation data structure in association with the transaction.

The method may include performing a token collision detection procedure to detect and remove duplicate tokens. The token collision detection procedure may include: comparing the output tokens with one another; and, if any two or more of the output tokens are the same, obtaining a new set of unique tokens.

Inputs into the token generating algorithm may include a seed value and one or both of a counter value and clock-based value, wherein the seed value and counter value are associated with the end-user. The seed value, counter value and time-based value to be known to the end-user token generator. The seed value and counter value may be uniquely associated with end-user in that copies of these values may be securely stored in the end-user token generator, which in turn is uniquely linked to the end-user (e.g. by way of secure registration). The token generating algorithm may be a one-time password (OTP) generating algorithm.

Obtaining the set of tokens may include incrementing a counter value associated with the end-user in response to generating the set of token values. Incrementing the counter value is in response to a collision detection procedure may determine that no two tokens of the set of tokens are the same.

The online platform may provide a secure communication channel via which the end-user can receive data from and input data into the server computer. The end-user token generator may be a pre-initialized end-user token generator, and wherein the end-user token generator is uniquely associated with the end-user.

In accordance with a further aspect of the invention there is provided a system including a server computer having a memory for storing computer-readable program code and a processor for executing the computer-readable program code, the server computer comprising: a transaction confirmation request receiving component for receiving a transaction confirmation request associated with a transaction; a user input option providing component for providing, to an end-user via an online platform, a plurality of user input options associated with the transaction; a unique token receiving component for receiving, from the end-user via the online platform, a unique token associated with a selected user input option, the unique token having been obtained by the end-user inputting a selection of a user input option into an end-user token generator which is configured to generate the unique token uniquely specifying the selected user input option; and, a validating and identifying component for validating the unique token and identifying the selected user input option with which the unique token is associated.

The system may include a transaction initiation component for initiating the transaction in accordance with the identified user input option.

The system may include a token generation module comprising: a token generation request receiving component for receiving a token generation request including the plurality of user input options; a token generating component for generating a unique token associated with each user input option, including inputting each user input option into a token generating algorithm to generate a unique token based on the user input option; and, a token outputting component for outputting each unique token in association with the user input option with which it is associated.

The validating and identifying component may be configured to match the received unique token with one of a plurality of output tokens output by a token generation module, each one of the plurality of output tokens identifying a user input option associated therewith.

In accordance with a further aspect of the invention there is provided a computer program product comprising a computer-readable medium having stored computer-readable program code for performing the steps of: receiving a transaction confirmation request associated with a transaction; providing, to an end-user via an online platform, a plurality of user input options associated with the transaction; receiving, from the end-user via the online platform, a unique token associated with a selected user input option, the unique token having been obtained by the end-user inputting a selection of a user input option into an end-user token generator which is configured to generate the unique token uniquely specifying the selected user input option; and, validating the unique token and identifying the selected user input option with which the unique token is associated.

Further features provide for the computer-readable medium to be a non-transitory computer-readable medium and for the computer-readable program code to be executable by a processing circuit.

In accordance with a further aspect of the invention there is provided a computer-implemented method conducted at a server computer comprising: receiving a transaction confirmation request via an online platform provided by the server computer; providing a plurality of user input options associated with the transaction to the end-user via the online platform; receiving, from the end-user via the online platform, a unique token associated with a selected user input option, the unique token having been obtained by the end-user making a decision on a pre-initialized token device which generates a token uniquely specifying the decision; and, validating the unique token and identifying the selected user input option with which the unique token is associated.

In accordance with a further aspect of the invention there is provided a computer-implemented method conducted at a token generation module comprising: receiving a token generation request including a plurality of user input options associated with a transaction and an end-user, wherein the request is received in response to the end-user initiating the transaction via an online platform; generating a unique token associated with each user input option, including inputting each user input option into a token generating algorithm to generate a unique token based on the user input option; and, outputting each unique token in association with the user input option with which it is associated, wherein the user input options are provided to the end-user via the online platform for initiating the transaction in accordance with a selected user input option by making a decision on a pre-initialized token device which generates a token uniquely specifying the decision.

In accordance with a further aspect of the invention there is provided a system including a token generation module having a memory for storing computer-readable program code and a processor for executing the computer-readable program code, the token generation module comprising: a token generation request receiving component for receiving a token generation request including a plurality of user input options associated with a transaction and an end-user, wherein the request is received in response to the end-user initiating the transaction via an online platform; a token generating component for generating a unique token associated with each user input option, including inputting each user input option into a token generating algorithm to generate a unique token based on the user input option; and, a token outputting component for outputting each unique token in association with the user input option with which it is associated, wherein the user input options are provided to the end-user via the online platform for initiating the transaction in accordance with a selected user input option by making a decision on a pre-initialized token device which generates a token uniquely specifying the decision.

In accordance with a further aspect of the invention there is provided a computer program product comprising a computer-readable medium having stored computer-readable program code for performing the steps of: receiving a token generation request including a plurality of user input options associated with a transaction and an end-user, wherein the request is received in response to the end-user initiating the transaction via an online platform; generating a unique token associated with each user input option, including inputting each user input option into a token generating algorithm to generate a unique token based on the user input option; and, outputting each unique token in association with the user input option with which it is associated, wherein the user input options are provided to the end-user via the online platform for initiating the transaction in accordance with a selected user input option by making a decision on a pre-initialized token device which generates a token uniquely specifying the decision.

Further features provide for the computer-readable medium to be a non-transitory computer-readable medium and for the computer-readable program code to be executable by a processing circuit.

Embodiments of the invention will now be described, by way of example only, with reference to the accompanying drawings.

DETAILED DESCRIPTION WITH REFERENCE TO THE DRAWINGS

Aspects of the present disclosure relate to secure input using tokens. Aspects of the present disclosure may provide an offline end-user token generator and associated system and method via which a user input option or selection can be securely input into an online platform. Aspects of the present disclosure may provide an offline token generation implementation in which ownership (or possession) is tied to a particular decision taken by an end-user. Aspects of the present disclosure may provide (in some embodiments offline) token generation for conducting a secure transaction in which a user selection associated with the transaction is immutably linked or tied to a token configured for validation and/or authentication by a remote server computer. Secure input using tokens may thus be provided.

As one example, after entering a username and password combination to log onto a secure internet banking site, the end-user may be prompted to enter an option-based OTP to dictate how the secure transaction is to proceed. The end-user may for example be provided with three options for advancing the secure transaction, for example, being "Payment"; "Add beneficiary"; or "Maintain limits". The end-user may be instructed to enter a character string (e.g. one of "pay"; "add"; or "maintain") associated with each option into his or her OTP generator to generate an option-based OTP. The end-user may then enter the appropriate option-based OTP, and only the option-based OTP, into the internet banking site (i.e. the end-user may not be required to click or otherwise select one of the three options). Entry of the character string "pay", for example, may cause the OTP 98345 to be generated while entry of the character string "add" may cause the OTP 76634 to be generated. Thus by entering "76634" as the OTP into the internet banking site, the end-user may cause the internet banking site to load a page via which the end-user can add the payment details of a new beneficiary for saving in association with the end-user's profile. The end-user may then be restricted to adding one or more new beneficiaries and should the end-user wish to make a payment or maintain profile limits, another option-based OTP may be required.

It should of course be appreciated that the above use-case is merely exemplary, and applications beyond internet banking are anticipated. Further, aspects of the present disclosure are not limited to use of OTPs and can be implemented using any tokens which are in some way associated with a particular user input option.

Figure 1:
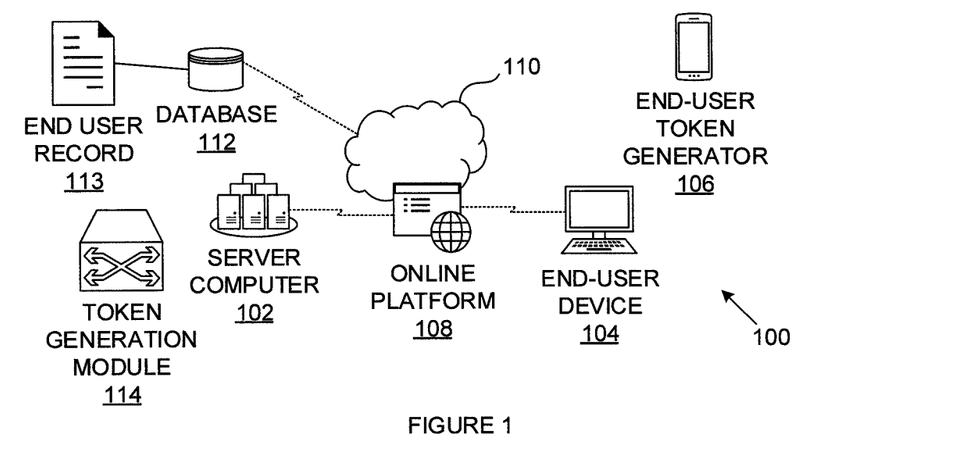
FIG. 1 is a schematic diagram which illustrates an exemplary system for secure input using tokens according to aspects of the present disclosure.

FIG. 1 is a schematic diagram which illustrates an exemplary system (100) for secure input using tokens. The system may include a server computer (102), an end-user device (104) and an end-user token generator (106).

The server computer (102) may be any suitable computing device configured to perform a server role. The server computer (102) may provide an online platform (108) via which the end-user device (104) interacts with the server computer (102). The online platform (108) may for example provide a secure communication channel (e.g. SSL, TLS, etc.) over a communication network (110) via which an end-user associated with the end-user device (104) can receive data from and input data into the server computer (102). The online platform (108) may for example be a secure website which is accessible to the end-user via a browser executing on the end-user device (104). In some cases, the online platform may be a hardware device, such as a point of sales device.

The server computer (102) may have access to a database (112) in which information and data may be stored and modified and from which data may be retrieved. The database (112) may include an end-user record (113) against which the end-user may be permitted to transact. In some implementations, one or more of a seed value associated with the end-user; a counter value associated with the end-user; a shared secret; a collision procedure specification; and references to one or more algorithms may be securely stored in the end-user record along with other relevant personal information. In a banking implementation, account data, profile limits, beneficiary data and the like may be stored in or in association with the end-user record. In some cases, a token validation data structure may be temporarily stored in or in association with the end-user record, e.g. for the duration of a transaction, for the duration of an associated time-to-live or the like.

The server computer (102) may have access to a token generation module (114) configured to generate and/or validate unique tokens. The token generation module (114) may be provided by a hardware security module maintained by the same entity maintaining the server computer (102) or alternatively by a third party service provider. The token generation module (114) may be configured to receive input in the form of user input options and to use the input in generating a token. The token generation module (114) may also have access to a securely stored seed value and optionally a counter value associated with the end-user as well as a clock-based value for use in generating the tokens. The token generation module (114) may be configured to generate tokens using suitable algorithms, such as one or more or a combination of time-based one-time password Algorithm (TOTP), HMAC-based one-time password algorithm (HOTP), digital signing, encryption, hashing or the like.

The end-user device (104) may be any suitable computing device, such as a desktop or laptop computer, tablet computer, mobile phone, smart appliance, wearable device or the like. The end-user device (104) may be configured to interact with the server computer (102) via the communication network (110). The end-user device (104) may for example execute a browser application configured to access the online platform (108) provided by the server computer (102) via which data can be exchanged and secure transactions initiated.

The end-user token generator (106) may be any suitable computing device configured for the generation of single-use tokens. The end-user token generator may be a pre-initialized token generator in that it has been registered with the server computer in association with the end-user. The end-user token generator may securely store a secret which is shared by the token generator and the server computer. The shared secret may for example be a symmetric encryption key which is known to both the server computer and the end-user token generator. In other implementations, the shared secret may be an asymmetric key-pair. For example, the token generator may store a token generator private key and server computer public key. The server computer on the other hand may store a server computer private key and a token generator public key.

In some implementations, the end-user token generator (106) may be a dedicated token generation device. In some implementations, the end-user token generator (106) may be a portable credential device, such as a contactless smart card. In some implementations, the end-user token generator (106) may be provided by a software application executing on a mobile device, such as a smartphone or other suitable portable computing device, associated with the end-user. The end-user token generator (106) may thus be a software token generator that implements two-step verification services by generating tokens using suitable algorithms, such as TOTP, HOTP, or the like. The end-user token generator (106) may be configured to receive input in the form of a user input option and to use the input in generating a token.

The end-user token generator (106) may securely store one or more of: a seed value associated with the end-user; a counter value; the shared secret; a collision procedure specification; and references to one or more algorithms. The end-user token generator (106) may have access to a clock-based value for use in generating the tokens. The seed value may be same as that to which the token generation module (114) has access and the counter value and/or clock-based value may be synchronised with those of the token generation module (114). The end-user token generator may thus be a pre-initialized token generating device in that it securely stores information which enables it to generate tokens based on user input which can be validated at the server computer (e.g. by comparison with other tokens based on the same user input).

The end-user token generator (106) may be an offline token generator. For example, the end-user token generator may operate independently of the token generation module (114) and/or without any communication link with the token generation module. This may allow the end-user token generator to operate in situations in which the end-user token generator does not have a network connection.

The system (100) described above may implement a method for secure input using tokens. An exemplary method for secure input using tokens is illustrated in the swim-lane flow diagram of FIG. 2 in which respective swim-lanes delineate steps, operations or procedures performed by respective entities or devices.

Figure 2:
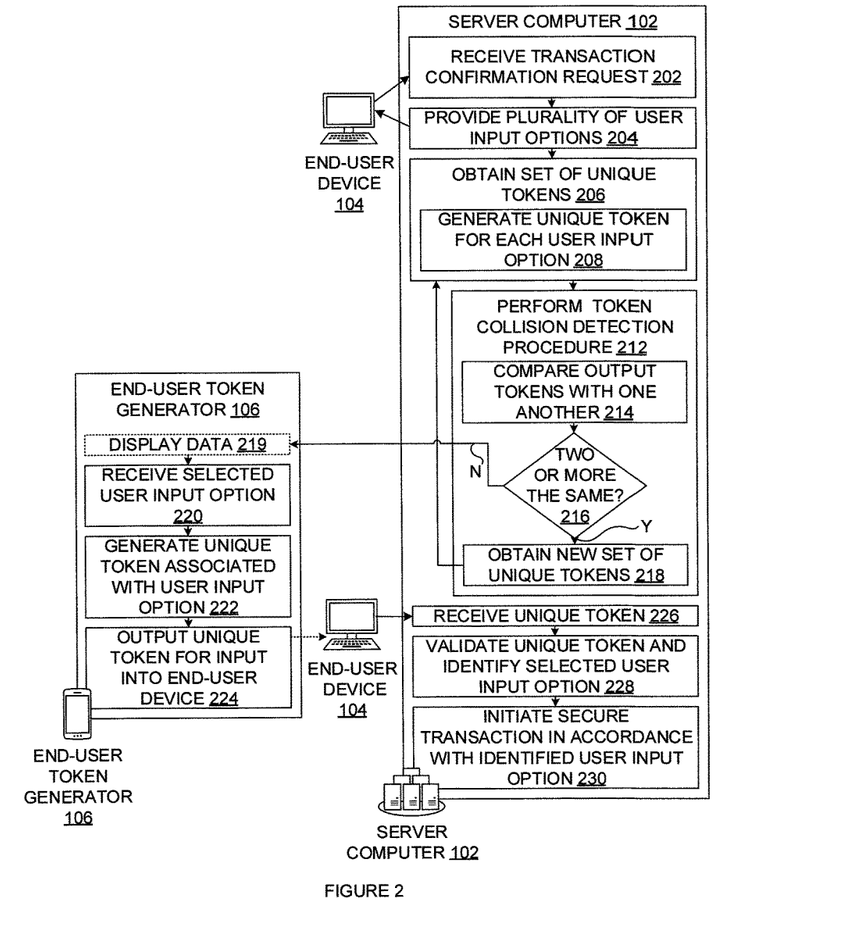
FIG. 2 is a swim-lane flow diagram which illustrates an exemplary method for secure input using tokens according to aspects of the present disclosure.

The method is described with reference to an exemplary internet baking scenario in which an end-user logs onto an online platform (108) provided by a financial institution with which the end-user banks in order to conduct a transaction (which may be a secure transaction). It should however be appreciated that the system and method described herein may be extended to any scenario or implementation in which secure transactions are conducted remotely, via online platforms or otherwise.

The server computer (102) may receive (202) a transaction confirmation request. The request may be associated with a transaction, which may be initiated by or otherwise associated with the end-user. The transaction confirmation request may be received from or via the online platform (108) provided by the server computer. The request may for example be received in response to the end-user entering login credentials (such as a username and password combination) into the online platform as a part of initiating a secure transaction. The transaction confirmation request may be a request that the transaction is confirmed by way of a second factor. The transaction confirmation request may include a request for a particular instruction or action selection in respect of the transaction. The transaction confirmation request may require a key decision, for example, approving or declining a transaction, a selection as to a card to use in a particular transaction or the like. Thus, in some cases the transaction confirmation request may act as a transaction instruction request in that the end-user is requested to provide a selection as to a particular action or instruction to be taken in respect of the transaction. The transaction confirmation request may be a secure transaction confirmation request and may be associated with the end-user and may for example be linked to the end-user record (113) stored in the database (112). This association may be by virtue of user credentials entered into the online platform or the like.

The server computer (102) may generate or access a plurality of user input options associated with the secure transaction. The server computer (102) may for example have access to a user input options database in and from which various input options may be stored and retrieved, each input option being associated with different types and/or stages of transactions.

The generated or accessed user input options may be a data structure (e.g. a list) including possible decision, commands or instructions that an end-user can input in respect of the transaction. The user input options may include a list or other suitable data structure including character strings describing each of a number of possible user inputs being relevant to the specific transaction in question. The user input options may be configured for easy manual reproduction. For example, each user input option may be a single word describing an associated operation or action and may be provided in capital letters.

The server computer (102) may provide (204) to the end-user the plurality of user input options associated with the secure transaction. In some implementations, the plurality of user input options may be provided to the end-user via the online platform (108) and in turn the end-user device (104). In other words, the options may be displayed to the end-user on a display of the end-user device (104). In the exemplary embodiment of FIG. 3, for example, the input options may relate to internet banking operations, such as paying a beneficiary, adding a new beneficiary, maintaining profile limits, reporting fraud, requesting certain documents or the like. Each of these operations may be associated with a user input option, such as "pay", "add", "maintain", "request" and the like. The user input options may for example be provided to the end-user via a dialog box displayed on the end-user device, such as that illustrated in FIG. 3.

Of course in other implementations, other user input options may be associated with other operations. In a cloud-based email service implementation, for example, the first time the end-user logs onto the online platform provided by the email service provider, he or she may prompted to enter one of, the following user input options based on his or her future access requirements, e.g.: "Use the input 'Always' when generating your code to register this PC as a trusted PC or 'Once' if you are logging on using this PC this time only".

Figure 4:
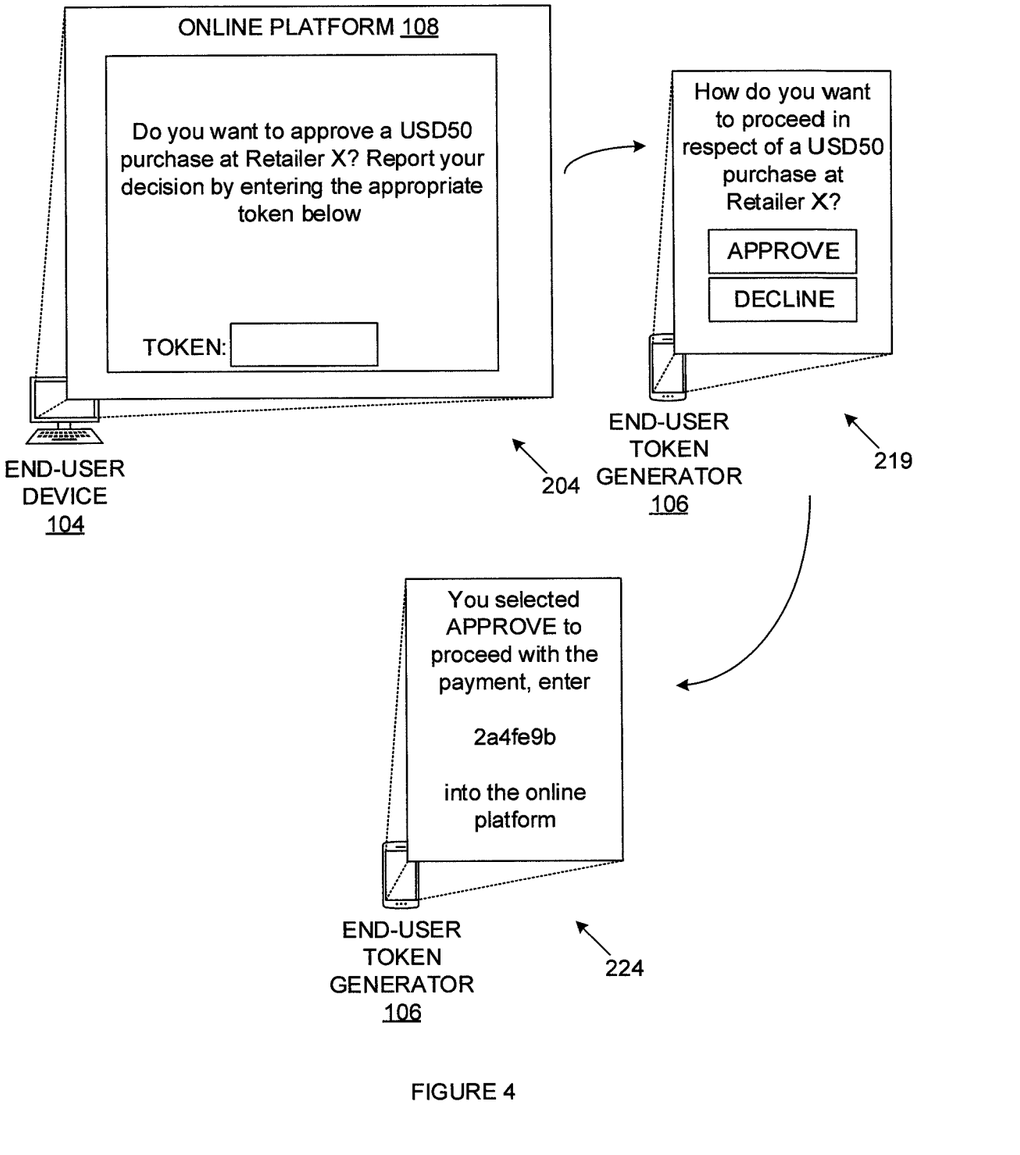
FIG. 4 is a schematic diagram which illustrates end-user interactions with the system and method described herein according to another embodiment.

In other embodiments, for example that illustrated in FIG. 4, the plurality of user input options may be provided to the end-user via the end-user token generator (106). The plurality of user input options may be provided to the end-user token generator (106) via the end-user device (104). In some implementations, the end-user device may forward or otherwise provide or output the plurality of user input options to the end-user token generator via an optical or radio-frequency (RF) communication mechanism (e.g. by way of a graphical code or using a short-range RF communication protocol, such as RFID or BLUETOOTH™).

In other embodiments, the plurality of user input options may be provided to the end-user token generator directly (e.g. via the communication network). In any of the embodiments described above, either one or both of the end-user device (104) and the end-user token generator (106) may display transaction information either together with or independently of the plurality of user input options. The transaction information (which may include or be in the form of a transaction reference) may be provided to the end-user token generator (106) via any one of the mechanisms described above (e.g. via a QR code displayed by the end-user device). In some implementations, as will be described in greater detail below, the transaction information (or a subset thereof, e.g. the reference) may be used as a seed value in the generation of the appropriate unique token. In some implementations, the transaction information may be encrypted using a shared secret such that only the end-user token generator (106) associated with a particular end-user can decrypt and display the transaction information.

The server computer (102) may obtain (206) a set of unique tokens. Each unique token may be based on, or mathematically linked to a user input option. Obtaining (206) the set of unique tokens may include generating (208), for each user input option, a unique token associated with that user input option (or sequence number associated with each user input option) including inputting the user input option (or sequence number) into a token generating algorithm to generate a unique token based on the user input option. Inputs into the token generating algorithm, in addition to the user input option, may include one or more of: a seed value; a counter value; clock-based value; a shared secret (e.g. symmetric or asymmetric key); a transaction secret (e.g. the transaction information or a subset thereof). The seed value and counter value may be associated with the end-user (e.g. may be securely stored in the end-user record). The seed value may be unique to the end-user and the counter value may be incremented each time a new token is generated. On that point, it should be appreciated that the counter value may be held constant for each of the different user input options. This may be to prevent the counter value at the server computer from running past the counter value of the end-user token generator. The clock-based value may be obtained from a clock which is synchronised with a clock maintained by or accessible to the end-user token generator. The seed value, counter value and time-based value may thus be known to or otherwise accessible to the end-user token generator (106).

The token generating algorithm may include any appropriate algorithm or combination of algorithms configured to generate a token based on one or more inputs. The algorithm or combination of algorithms may be selected from one or more of: a cryptographic hash function; an encryption function (e.g. using one or more of symmetric or asymmetric keys); a one-time password (OTP) generating algorithm, such as the HOTP or TOTP algorithms; a digital signature generating algorithm (e.g. using a private key); and the like.

Obtaining (206) the set of unique tokens may include outputting each unique token in association with the user input option with which it is associated. This may for example include outputting a data structure (e.g. a file or list or the like) that links each token to its associated user input. The data structure may be a token validation data structure configured for validation of a received token and identification of an associated user input option. For example, in some implementations the data structure may be in the form of a text file (e.g. in comma separated value format). For example, the output may be in the form: "'pay',45645;'add', 54665;'maintain',19033;'request',69367" such that each user input option is linked to a unique token. Each unique token may be output in association with the user input option with which it is associated/on which it is based. The output tokens may be stored temporarily in association with the transaction.

Obtaining (206) the set of unique tokens may include obtaining the tokens from a token generation module (114) which may output the unique set of tokens in association with the user input option with which they are based. This may include transmitting or inputting a token generation request including the plurality of user input options to or into the token generation module and receiving an output of each unique token in association with the user input option with which it is associated from the token generation module.

The server computer (102) may perform (212) a token collision detection procedure. The token collision detection procedure may be configured to detect duplicate tokens in the set of tokens obtained. The collision detection procedure may include comparing (214) the output tokens with one another and if (216) any two or more of the output tokens are the same, obtaining (218) a new set of unique tokens. This procedure may be repeated for each set of unique tokens until (216) no two tokens in the set of tokens are the same. In some implementations, obtaining (218) a new set of unique tokens may include using a new algorithm. For example, if the initial algorithm is to convert text to ASCII code and hash this with SHA256, then in response to detecting a token collision, a predetermined, and different, hashing algorithm may be used. In other cases, one or more of a predetermined "salt", timestamp or the option sequence number may be used in obtaining the new set of tokens. Using a new algorithm may include using an algorithm defined in a collision procedure specification, which may for example define a sequence of algorithms to be used. The collision procedure specification may be any suitable data structure and may be known to both the server computer and the end-user token generator such that both devices execute the same procedure in attempting to remove duplicate tokens.

Meanwhile, the end-user may view the plurality of user input options associated with the secure transaction via the online platform (108). As described above, the plurality of user input options and optionally transaction information may be viewed via a display of one or both of the end-user device (104) or the end-user token generator (106). The end-user may select an input option associated with his or her desired transaction or command and may input the user input option associated therewith into the end-user token generator (106).

Figure 3:
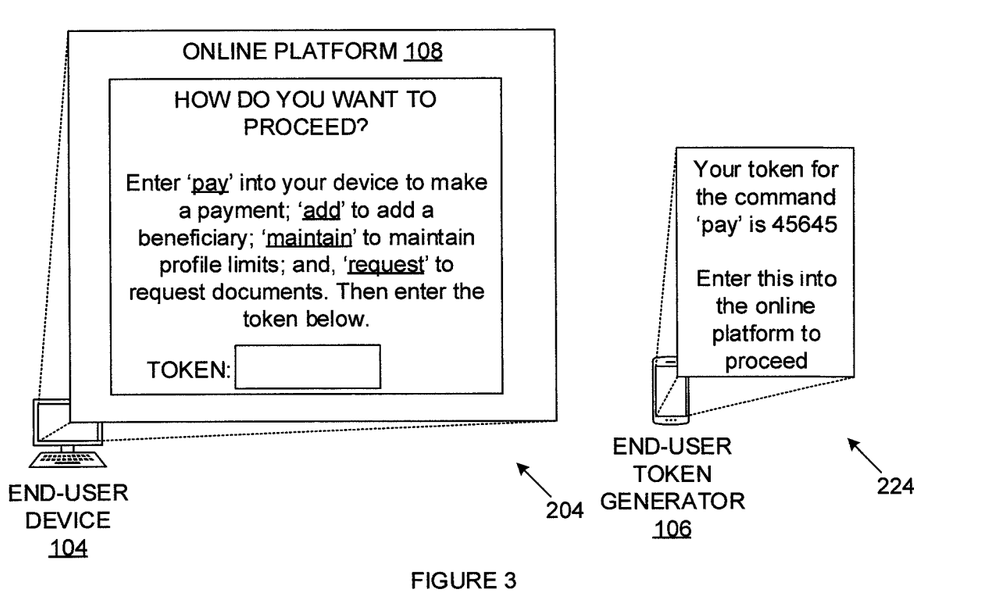
FIG. 3 is a schematic diagram which illustrates end-user interactions with the system and method described herein according to one embodiment.

With reference to the exemplary embodiment of FIG. 3, for example, the end-user may select the input option "pay" and may input the user input option associated therewith into the end-user token generator (106). The end-user may enter the selected user input option into the end-user token generator by typing the option in, or in some implementations, by selecting or activating an appropriate input icon. For example, in the embodiment of FIG. 4, one or both of the transaction information and user input options may be displayed (219) to the end-user via a display of the end-user token generator (106) and the end-user may select the option by activating either the "approve" or "decline" icon.

The end-user token generator (106) may receive (220) the selected user input option via a user interface and may use the selected user input option to generate (222) a unique token associated with the selected user input option. Generating the unique token may include inputting the selected user input option or a sequence number associated with the selected user input option (e.g. the second option, third option, etc.) into a token generating algorithm to generate a unique token based on the selected user input option.

Other inputs into the token generating algorithm may include one or more of: a seed value; a counter value; clock-based value; a shared secret (e.g. symmetric or asymmetric key); a transaction secret (e.g. the transaction information or a subset thereof). The seed value and counter value may be securely stored within the end-user token generator. The seed value may be unique to the end-user and the counter value may be incremented each time a new token is generated.

As mentioned, the token generating algorithm may include any appropriate algorithm or combination of algorithms configured to generate a token based on one or more inputs. The algorithm or combination of algorithms may be selected from one or more of: a cryptographic hash function; an encryption function (e.g. using one or more of symmetric or asymmetric keys); a one-time password (OTP) generating algorithm, such as the HOTP or TOTP algorithms; a digital signature generating algorithm (e.g. using a private key); and the like.

The end-user token generator (106) may output (224) the unique token (e.g. 45645, 2a4fe9b or the like) having been generated based on the end-user input, e.g. as shown in FIGS. 3 and 4. In some implementations, the end-user token generator (106) may output the token to a display thereof for copying and entry by the end-user into the online portal for submission. The end-user may then input the unique token (e.g. 45645 or 2a4fe9b) into the online portal for transmission to the server computer (102). In other implementations, the token may be output to the end-user device (e.g. using an optical or RF communication mechanism).

The server computer (102) may receive (226) the unique token associated with a selected user input option. The selected user input token is an input option selected by the end-user from one of the plurality of user input tokens that were provided to the end-user.

The unique token may be received from the end-user via the online platform (108). As illustrated above, the unique token is obtained by the end-user via another channel (i.e. not via the online platform but rather from his or her token generating device). Further, the unique token is generated by inputting the selected user input option into a token generating algorithm to generate a unique token based on the selected user input option. It should be appreciated that the user may input only the unique token into the online portal. In other words, the user may not be required to input a selection into the online portal as the unique token may act as the user selection or action instruction. This may mean that a nefarious "man-in-the-middle" intercepting communications between the end-user device and the server computer may have no way of knowing with which option or action the user intends proceeding.

The server computer (102) may validate the unique token and identify (228) the selected user input option with which the unique token is associated. This may include matching the received unique token with one of the output tokens and identifying the user input option which is associated with the matching output token. If validation is unsuccessful, the transaction may be aborted and the end-user may be notified accordingly.

The server computer (102) may initiate (230) the transaction in accordance with the identified user input option. In the illustrated scenario, for example, the server computer may direct the end-user to a facility by way of which the end-user can conduct a payment. In some implementations, the server computer may initiate a secure session which is limited to performance of the relevant action or operation associated with the particular user input option submitted to the server computer. For example, if the user input option is associated with an 'add beneficiary' instruction, the server computer may initiate a secure session via which the user can only add a new beneficiary. Other functionality which may typically be available to the user, such as paying a beneficiary, checking an account balance, etc., may be disabled or otherwise unavailable via the secure session.

The method may therefore enable secure input of a user input option into a server computer via a (potentially offline) end-user token generator.

Figure 5:
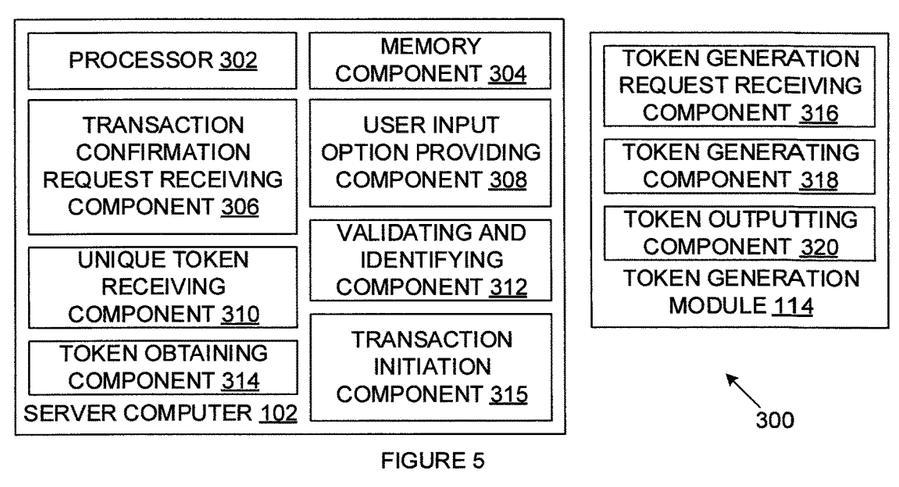
FIG. 5 is a block diagram which illustrates exemplary components which may be provided by a system for secure input using tokens according to aspects of the present disclosure.

Various components may be provided for implementing the method described above with reference to FIG. 2. FIG. 5 is a block diagram which illustrates exemplary components which may be provided by a system for secure input using tokens. The system (300) may include a server computer (102) and a token generation module (114).

The server computer (102) may include a processor (302) for executing the functions of components described below, which may be provided by hardware or by software units executing on the server computer (102). The software units may be stored in a memory component (304) and instructions may be provided to the processor (302) to carry out the functionality of the described components. In some cases, software units arranged to manage and/or process data on behalf of the server computer (102) may be provided remotely. For example, in some implementations, the token generation module (114) may be used to generate tokens based on user input options. In other implementations, this functionality may be provided by the server computer itself.

The server computer (102) may include a transaction confirmation request receiving component (306) which may be configured to receive a transaction confirmation request. The transaction confirmation request may be associated with a transaction and may be received via an online platform provided by the server computer. The transaction confirmation request may be associated with an end-user.

The server computer (102) may include a user input option providing component (308) arranged to provide a plurality of user input options associated with the transaction to the end-user via the online platform.

The server computer (102) may include a unique token receiving component (310) arranged to receive, from the end-user via the online platform, a unique token associated with a selected user input option. The unique token may have been obtained by the end-user via another channel and may have been generated by the user inputting a selection of a user input option into a token generating algorithm (e.g. by inputting the selection of a user input option into an end-user token generator) to generate a unique token based on the selected user input option (and hence uniquely specifying the selected user input option).

The server computer (102) may include a validating and identifying component (312) arranged to validate the unique token and identify the selected user input option with which the unique token is associated. The validating and identifying component (312) may be configured to match the received unique token with one of a plurality of output tokens output by the token generation module (114), where each one of the plurality of output tokens identifies a user input option associated therewith.

The server computer (102) may include a token obtaining component (314) arranged to obtain a set of tokens, each token being based on one of the plurality of user input options. The token obtaining component (314) may obtain the set of tokens from the token generation module (114) and may be configured generate and transmit to the token generation module (114) a token generation request including the plurality of user input options.

The server computer (102) may include a transaction initiation component (315) arranged to initiate the transaction in accordance with the identified user input option.

The token generation module (114) may include a token generation request receiving component (316) arranged to receive a token generation request. The token generation request may include a plurality of user input options associated with a transaction and an end-user. The request may be received in response to the end-user initiating the transaction via an online platform.

The token generation module (114) may include a token generating component (318) arranged to generate a unique token associated with each user input option. The token generating component may be configured to input each user input option into a token generating algorithm to generate a unique token based on the user input option.

The token generation module (114) may include a token outputting component (320) arranged to output each unique token in association with the user input option with which it is associated. The token outputting component (320) may be configured to output the tokens in a token validation data structure in which each unique token is linked to the associated user input option on which it is based (and hence identifies the user input option associated therewith).

Aspects of the present disclosure relate to generating at the end-user device one OTP for one selection and another OTP for another selection. In other words, each selection results in the generation of its own OTP. The server knows which OTP is associated with which selection and so in validating the OTP it is able to ascertain the selection by the end-user. The selection may be input as a string into the OTP algorithm. As the OTP is generated using a seed uniquely associated with the end-user, the end-user's selection may thus be tied to the end-user. It should be appreciated that in some implementations, the token generating algorithm may generate the token by digitally signing the selected user input option.

The system and method described herein enable specific options to be provided for an authentication. The system and method described herein are intended to prevent a malicious third party who may be present on a channel or otherwise intercepting (and potentially altering) communications on that channel from being privy to the actual decision that was made by the end-user and from injecting or making a fraudulent decision on behalf of the end-user (e.g. as would be in a so-called "man in the middle" attack). The system and method described herein may find particular application in scenarios in which the end-user token generator cannot connect directly to the server computer, and has to engage via the online platform.

The present disclosure may extend the gatekeeping role traditionally associated with one-time passwords (OTPs) to a decision-based paradigm, in which ownership is tied to a particular decision as opposed simply to authentication. For a given transaction, multiple OTPs may be generated for each option that may be input in association with that transaction and the transaction proceeds according to the decision which is associated with the OTP which is input.

Figure 6:
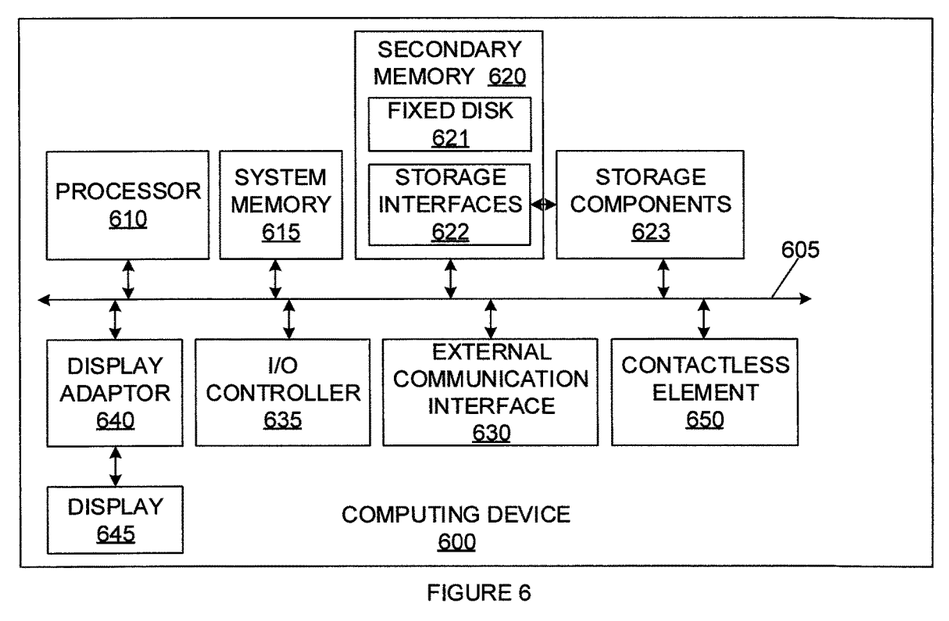
FIG. 6 illustrates an example of a computing device in which various aspects of the disclosure may be implemented.

FIG. 6 illustrates an example of a computing device (600) in which various aspects of the disclosure may be implemented. The computing device (600) may be embodied as any form of data processing device including a personal computing device (e.g. laptop or desktop computer), a server computer (which may be self-contained, physically distributed over a number of locations), a client computer, or a communication device, such as a mobile phone (e.g. cellular telephone), satellite phone, tablet computer, personal digital assistant or the like. Different embodiments of the computing device may dictate the inclusion or exclusion of various components or subsystems described below.

The computing device (600) may be suitable for storing and executing computer program code. The various participants and elements in the previously described system diagrams may use any suitable number of subsystems or components of the computing device (600) to facilitate the functions described herein. The computing device (600) may include subsystems or components interconnected via a communication infrastructure (605) (for example, a communications bus, a network, etc.). The computing device (600) may include one or more processors (610) and at least one memory component in the form of computer-readable media. The one or more processors (610) may include one or more of CPUs, graphical processing units (GPUs), microprocessors, field programmable gate arrays (FPGAs), application specific integrated circuits (ASICs) and the like. In some configurations, a number of processors may be provided and may be arranged to carry out calculations simultaneously. In some implementations various subsystems or components of the computing device (600) may be distributed over a number of physical locations (e.g. in a distributed, cluster or cloud-based computing configuration) and appropriate software units may be arranged to manage and/or process data on behalf of remote devices.

The memory components may include system memory (615), which may include read only memory (ROM) and random access memory (RAM). A basic input/output system (BIOS) may be stored in ROM. System software may be stored in the system memory (615) including operating system software. The memory components may also include secondary memory (620). The secondary memory (620) may include a fixed disk (621), such as a hard disk drive, and, optionally, one or more storage interfaces (622) for interfacing with storage components (623), such as removable storage components (e.g. magnetic tape, optical disk, flash memory drive, external hard drive, removable memory chip, etc.), network attached storage components (e.g. NAS drives), remote storage components (e.g. cloud-based storage) or the like.

The computing device (600) may include an external communications interface (630) for operation of the computing device (600) in a networked environment enabling transfer of data between multiple computing devices (600) and/or the Internet. Data transferred via the external communications interface (630) may be in the form of signals, which may be electronic, electromagnetic, optical, radio, or other types of signal. The external communications interface (630) may enable communication of data between the computing device (600) and other computing devices including servers and external storage facilities. Web services may be accessible by and/or from the computing device (600) via the communications interface (630).

The external communications interface (630) may be configured for connection to wireless communication channels (e.g., a cellular telephone network, wireless local area network (e.g. using Wi-Fi™), satellite-phone network, Satellite Internet Network, etc.) and may include an associated wireless transfer element, such as an antenna and associated circuitry. The external communications interface (630) may include a subscriber identity module (SIM) in the form of an integrated circuit that stores an international mobile subscriber identity and the related key used to identify and authenticate a subscriber using the computing device (600). One or more subscriber identity modules may be removable from or embedded in the computing device (600).

The external communications interface (630) may further include a contactless element (650), which is typically implemented in the form of a semiconductor chip (or other data storage element) with an associated wireless transfer element, such as an antenna. The contactless element (650) may be associated with (e.g., embedded within) the computing device (600) and data or control instructions transmitted via a cellular network may be applied to the contactless element (650) by means of a contactless element interface (not shown). The contactless element interface may function to permit the exchange of data and/or control instructions between computing device circuitry (and hence the cellular network) and the contactless element (650). The contactless element (650) may be capable of transferring and receiving data using a near field communications capability (or near field communications medium) typically in accordance with a standardized protocol or data transfer mechanism (e.g., ISO 14443/NFC). Near field communications capability may include a short-range communications capability, such as radio-frequency identification (RFID), Bluetooth™, infra-red, or other data transfer capability that can be used to exchange data between the computing device (600) and an interrogation device. Thus, the computing device (600) may be capable of communicating and transferring data and/or control instructions via both a cellular network and near field communications capability.

The computer-readable media in the form of the various memory components may provide storage of computer-executable instructions, data structures, program modules, software units and other data. A computer program product may be provided by a computer-readable medium having stored computer-readable program code executable by the central processor (610). A computer program product may be provided by a non-transient computer-readable medium, or may be provided via a signal or other transient means via the communications interface (630).

Interconnection via the communication infrastructure (605) allows the one or more processors (610) to communicate with each subsystem or component and to control the execution of instructions from the memory components, as well as the exchange of information between subsystems or components. Peripherals (such as printers, scanners, cameras, or the like) and input/output (I/O) devices (such as a mouse, touchpad, keyboard, microphone, touch-sensitive display, input buttons, speakers and the like) may couple to or be integrally formed with the computing device (600) either directly or via an I/O controller (635). One or more displays (645) (which may be touch-sensitive displays) may be coupled to or integrally formed with the computing device (600) via a display (645) or video adapter (640).

The foregoing description has been presented for the purpose of illustration; it is not intended to be exhaustive or to limit the invention to the precise forms disclosed. Persons skilled in the relevant art can appreciate that many modifications and variations are possible in light of the above disclosure.

Any of the steps, operations, components or processes described herein may be performed or implemented with one or more hardware or software units, alone or in combination with other devices. In one embodiment, a software unit is implemented with a computer program product comprising a non-transient computer-readable medium containing computer program code, which can be executed by a processor for performing any or all of the steps, operations, or processes described. Software units or functions described in this application may be implemented as computer program code using any suitable computer language such as, for example, Java™, C++, or Perl™ using, for example, conventional or object-oriented techniques. The computer program code may be stored as a series of instructions, or commands on a non-transitory computer-readable medium, such as a random access memory (RAM), a read-only memory (ROM), a magnetic medium such as a hard-drive, or an optical medium such as a CD-ROM. Any such computer-readable medium may also reside on or within a single computational apparatus, and may be present on or within different computational apparatuses within a system or network.

Flowchart illustrations and block diagrams of methods, systems, and computer program products according to embodiments are used herein. Each block of the flowchart illustrations and/or block diagrams, and combinations of blocks in the flowchart illustrations and/or block diagrams, may provide functions which may be implemented by computer readable program instructions. In some alternative implementations, the functions identified by the blocks may take place in a different order to that shown in the flowchart illustrations.

The language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

Finally, throughout the specification and claims unless the contents requires otherwise the word 'comprise' or variations such as 'comprises' or 'comprising' will be understood to imply the inclusion of a stated integer or group of integers but not the exclusion of any other integer or group of integers.

The invention claimed is:

1. A computer-implemented method conducted at a server computer comprising:
    receiving a transaction confirmation request associated with a transaction;
    providing, to an end-user via an online platform, a plurality of user input options associated with the transaction;
    prompting the end-user to select a user input option from the plurality of user input options for input of a selected user input option into an end-user token generator which is configured to generate a unique token uniquely specifying the selected user input option;
    receiving, from the end-user via the online platform, the unique token associated with the selected user input option and having been obtained by the end-user inputting the selected user input option into the end-user token generator; and,
identifying the selected user input option with which the unique token is associated.

2. The method as claimed in claim 1, including accessing the plurality of user input options.

3. The method as claimed in claim 1, wherein the plurality of user input options includes a data structure including user input options in the form of character strings, each character string being associated with a decision, command or instruction that the end-user can input in respect of the transaction.

4. The method as claimed in claim 1, including initiating the transaction in accordance with the identified user input option.

5. The method as claimed in claim 1, wherein identifying the selected user input option includes matching the received unique token with one of a plurality of output tokens included in a token validation data structure and identifying a user input option associated therewith.

6. The method as claimed in claim 1, including obtaining a set of unique tokens for validation of the received unique token, including:
   generating a unique token associated with each user input option, including inputting each user input option into a token generating algorithm to generate a unique token based on the user input option; and,
   outputting each unique token in association with the user input option with which it is associated.

7. The method as claimed in claim 6, wherein outputting each unique token in association with the user input option with which it is associated includes outputting a token validation data structure in which each unique token is linked to the user input option with which it is associated.

8. The method as claimed in claim 7, including temporarily storing the token validation data structure in association with the transaction.

9. The method as claimed in claim 6, including performing a token collision detection procedure to detect and remove duplicate tokens.

10. The method as claimed in claim 9, wherein the token collision detection procedure includes:
    comparing the output tokens with one another; and,
    if any two or more of the output tokens are the same, obtaining a new set of unique tokens.

11. The method as claimed in claim 6, wherein inputs into the token generating algorithm include a seed value and one or both of a counter value and clock-based value, wherein the seed value and counter value are associated with the end-user, and wherein the seed value, counter value and time-based value are known to the end-user token generator.

12. The method as claimed in claim 6, wherein obtaining the set of tokens includes incrementing a counter value associated with the end-user in response to generating the set of token values.

13. The method as claimed in claim 12, wherein incrementing the counter value is in response to a collision detection procedure determining that no two tokens of the set of tokens are the same.

14. The method as claimed in claim 1, wherein the online platform provides a secure communication channel via which the end-user can receive data from and input data into the server computer.

15. The method as claimed in claim 1, wherein the end-user token generator is a pre-initialized end-user token generator, and wherein the end-user token generator is uniquely associated with the end-user.

16. A system including a server computer having a memory for storing computer-readable program code and a processor for executing the computer-readable program code, the server computer comprising:
   a transaction confirmation request receiving component for receiving a transaction confirmation request associated with a transaction;
   a user input option providing component for providing, to an end-user via an online platform, a plurality of user input options associated with the transaction;
   a user prompting component for prompting the end-user to select a user input option from the plurality of user input options for input of a selected user input option into an end-user token generator which is configured to generate a unique token uniquely specifying the selected user input option;
   a unique token receiving component for receiving, from the end-user via the online platform, the unique token associated with the selected user input option and having been obtained by the end-user inputting the selected user input option into the end-user token generator; and,
   an identifying component for identifying the selected user input option with which the unique token is associated.

17. The system as claimed in claim 16, including a transaction initiation component for initiating the transaction in accordance with the identified user input option.

18. The system as claimed in claim 16, including a token generation module comprising:
   a token generation request receiving component for receiving a token generation request including the plurality of user input options;
   a token generating component for generating a unique token associated with each user input option, including inputting each user input option into a token generating algorithm to generate a unique token based on the user input option; and,
   a token outputting component for outputting each unique token in association with the user input option with which it is associated.

19. The system as claimed in claim 16, wherein the validating and identifying component is configured to match the received unique token with one of a plurality of output tokens output by a token generation module, each one of the plurality of output tokens identifying a user input option associated therewith.

20. A computer program product comprising a computer-readable medium having stored computer-readable program code for performing the steps of:
   receiving a transaction confirmation request associated with a transaction;
      providing, to an end-user via an online platform, a plurality of user input options associated with the transaction;
   prompting the end-user to select a user input option from the plurality of user input options for input of a selected user input option into an end-user token generator which is configured to generate a unique token uniquely specifying the selected user input option;
   receiving, from the end-user via the online platform, the unique token associated with the selected user input option and having been obtained by the end-user inputting the selected user input option into the end-user token generator; and,
   identifying the selected user input option with which the unique token is associated.

* * * * *